(12) United States Patent
Kondo et al.

(10) Patent No.: US 8,482,245 B2
(45) Date of Patent: Jul. 9, 2013

(54) POWER CONVERSION DEVICE

(75) Inventors: Takeshi Kondo, Mishima (JP);
Katsutoshi Miyazaki, Guangdong (CN)

(73) Assignee: Meidensha Corporation, Tokyo (JP)

( * ) Notice: Subject to any disclaimer, the term of this patent is extended or adjusted under 35 U.S.C. 154(b) by 450 days.

(21) Appl. No.: 12/933,206

(22) PCT Filed: Mar. 19, 2009

(86) PCT No.: PCT/JP2009/055491
§ 371 (c)(1),
(2), (4) Date: Sep. 17, 2010

(87) PCT Pub. No.: WO2009/116641
PCT Pub. Date: Sep. 24, 2009

(65) Prior Publication Data
US 2011/0001464 A1    Jan. 6, 2011

(30) Foreign Application Priority Data
Mar. 21, 2008  (JP) .................. 2008-072825

(51) Int. Cl.
*H02P 27/04* (2006.01)
(52) U.S. Cl.
USPC ........... 318/801; 318/800; 318/721; 318/805; 318/375; 363/40; 363/55; 363/56.01; 307/10.1
(58) Field of Classification Search
USPC ................ 318/432, 721, 762, 801, 805, 811, 318/374, 375; 363/15, 16, 21.01, 23, 26, 363/27, 34, 35, 36, 40, 41, 44, 55, 56.01, 363/109, 111, 124, 131; 307/10.1; 320/134
See application file for complete search history.

(56) References Cited

U.S. PATENT DOCUMENTS

| 7,292,004 B2 * | 11/2007 | Ueda et al. ................... 318/805 |
| 7,615,887 B2 * | 11/2009 | Stancu et al. .................. 307/46 |
| 8,154,254 B2 * | 4/2012 | Ichikawa et al. ............. 320/134 |

FOREIGN PATENT DOCUMENTS

| JP | 2002-325465 A | 11/2002 |
| JP | 2003-52134 A | 2/2003 |
| JP | 2003-111493 A | 4/2003 |
| JP | 2007-60796 A | 3/2007 |
| JP | 2007-209056 A | 8/2007 |

OTHER PUBLICATIONS

Takeshi Kondo et al., DC Power Assistance System With Using DC Chopper and Electric Double Layer Capacitor, Institute of Electrical Engineers of Japan Metals Industry Research Committee Materials, Institute of Electrical Engineers of Japan, Mar. 19, 2008, MID-08, 1-7, pp. 17-20.

* cited by examiner

*Primary Examiner* — Antony M Paul
(74) *Attorney, Agent, or Firm* — Foley & Lardner LLP

(57) ABSTRACT

A power conversion device in which an inverter for controlling a load is connected to an alternating current power system, and arranged to perform an electric power assist by connecting a direct-current power assist device having a chopper and a charge device to a direct-current circuit of the inverter. The device including a setting section to set charge and discharge target values in accordance with a sensed value of the direct-current voltage of the inverter; a charge control section to perform a charge control based on the charge target value; a discharge control section to perform a discharge control based on the discharge target value; and an instantaneous-low high-speed-compensation section to estimate an electric power corresponding to a direct-current sensed voltage of the inverter, and to output a value to the discharge control section which is obtained by dividing the estimated value by the direct-current sensed voltage.

4 Claims, 4 Drawing Sheets

POWER CONVERSION DEVICE

TECHNICAL FIELD

This invention relates to a power conversion device, and specifically to a direct-current electric power assist device including a step-up and step-down chopper and a charge device.

BACKGROUND ART

A power conversion device is used as a device connected between an alternating current power system and a load, and arranged to assist a load power. This power conversion device includes a direct-current power assist device including a step-up and step-down chopper and a charge device such as an electric double layer capacitor, and an inverter device. The above-mentioned assist includes a peak cut of the electric power, a leveling of the load, an electric power storage, and compensation of an instantaneous voltage drop. A patent document 1 and so on is known as this assist.

The patent document 1 includes (is constituted by) a power buffer of an instantaneous force type which is connected to a direct-current circuit of the inverter device through a bidirectional DC/DC converter, and a power buffer of an endurance type which is connected in parallel with the power buffer of the instantaneous force type through a second bidirectional DC/DC converter. The power buffer of the instantaneous force type deals with a sudden variation of the load, and thereby a lifetime of the power buffer of the endurance type is lengthened by avoiding the sudden charge and the sudden discharge of the power buffer of the endurance type.

Patent Document 1: Japanese Patent Application Publication No. 2007-60796

DISCLOSURE OF THE INVENTION

Problems to be Solved by the Invention

In the above-described patent document 1, as shown in FIG. 5, while the amount of the stored electricity is maintained at about 50 percent of a charging capacity, a certain period of time is monitored, the charge or the discharge is performed. With this, the apparatus has functions of load leveling and uninterruptible power system. However, this method can not control the amount of the peak cut as the power assist. Moreover, it is impossible to carry out discrete control of the charge and the discharge which is unique to a load corresponding to the intended use. In particular, when the control operation is performed so as not to charge and discharge in a system in which the electric power is supplied to the load by using the power conversion device with the commercial electric system, the energy of the overall system may be effectively used. In this case, it is anticipated that the lifetime of the charge device used in the direct-current power assist device is lengthened.

It is an object of the present invention to provide a power conversion device arranged to effectively perform a power assist.

Means for Solving the Problem

In the present invention, a power conversion device in which an inverter for controlling a load is connected to an alternating current power system, and which is arranged to perform an electric power assist by connecting a direct-current power assist device having a chopper and a charge device, to a direct-current circuit of the inverter, the power conversion device comprises: a setting section for performing a charge control and a discharge control of the charge device; a charge control section configured to perform the charge control based on a charge target value set by the setting section; a discharge control section configured to perform the discharge control based on a discharge target value set by the setting section; and an instantaneous-low high-speed-compensation section configured to estimate an electric power corresponding to a direct-current sensed voltage of the inverter, and to output a value which is obtained by dividing the estimated value by the direct-current sensed voltage, to the discharge control section, the setting section having setting values of a charge start voltage, a charge stop voltage, a non-control voltage region, a discharge stop voltage, and a discharge start voltage, the setting section selecting the setting values in accordance with the sensed value of the direct-current sensed voltage of the inverter, and the setting section outputting the setting values to the charge control section and the discharge control section as the charge target value and the discharge target value.

Moreover, the charge control section and the discharge control section according to the present invention include, respectively, voltage control sections configured to receive deviation signals between the charge target value or the discharge target value, and the direct-current sensed voltage of the inverter, and to calculate the charge command value and the discharge command value, current control sections configured to receive deviation values between the charge command value or the discharge command value outputted from the voltage control sections, and a sensed current of the charge device, and to calculate currents; and PWM control sections configured to receive, respectively, the charge command value and the discharge command value from the current control sections, and to produce gate signals of a charge switching element and a discharge switching element of the chopper.

The instantaneous-low high-speed-compensation section according to the present invention calculates a variation of the electric power from a variation of a discharge energy by a capacity of a capacitor installed in the direct current circuit of the inverter, and a sampling value of the inputted direct current sensed voltage, and to produce a discharge current command by dividing the calculated variation of the electric power by the direct-current sensed voltage.

In the present invention, the power conversion device includes a load compensation gain section configured to calculate a gain compensation signal in accordance with a deviation signal between a set terminal voltage discharge threshold value of the charge device and a sensed terminal voltage of the charge device, and a drive torque limiter section provided on an output side of a current control section of a control section of the inverter; and a limiter value of the drive torque limiter section is varied in accordance with the gain compensation signal outputted from the load compensation gain section.

ADVANTAGES OF THE INVENTION

As mentioned above, by the present invention, it is possible to set the charge control and the discharge control independently, and to set the direct-current voltage in accordance with the installation. With this, it is possible to hold the minimum direct-current voltage necessary for ensuring the maximum voltage of the motor and so on, and to decrease the switching loss of the switching element constituting the inverter and the chopper. Moreover, a non-control region is provided in a setting. With this, the unnecessary power assist is not needed. It is possible to effectively operate the overall system, and to lengthen the lifetime of the assist device.

BEST MODE FOR CARRYING OUT THE INVENTION

FIG. 3 shows a block diagram showing a power conversion device to which the present invention is applied. A numeral 1 is an inverter. The power conversion device includes electric power rectifier section 2, a bidirectional power conversion section 3 configured to convert bidirectional power of DC/AC, and a capacitor 4 for the smoothing. A numeral 5 is an alternating current electric power system for a private power generator or a commercial power generator. A numeral 6 is an example of a load including a motor M and a generator G connected to the motor M. A numeral 8 is a direct-current power assist device. The direct-current power assist device 8 is connected between positive and negative terminals of the direct-current circuit of the inverter 1. The direct-current power assist device 8 includes a chopper section CH including a bidirectional DC/DC converter Con, a current detection section Di, a reactor L, and a charge (charged) device C. An electric double layer capacitor is used as the charge device C.

FIG. 1 shows a control circuit of the direct-current power assist device according to the present invention. This is applied to the control of the power assist device 8 of FIG. 3.

A numeral 9 is a setting section. The setting section 9 selects, as setting values, a charge start voltage, a charge target voltage, a charge stop voltage, a non-control voltage region, a discharge stop voltage, a discharge target voltage, and a discharge start voltage, in accordance with a detection value of a direct-current voltage VDC of the inverter 1, and outputs these values. A charge control, a discharge control, and a non-control are state-transited by a sequence control by a comparator. The charge control, the discharge control, and the non-control are not simultaneously performed by interlock with each other. Regions in the setting section 9 to which diagonal lines are attached are a charge control retention period and a discharge control retention period. A charge target value VDCH* and a discharge target value VDCL* are set, respectively, in these periods, and outputted as command values.

A numeral 10 is a charge control section. This charge control section 10 includes a subtraction section 11 configured to calculate a difference between the set value VDCH* outputted from the setting section 9 and the detection value of the direct-current voltage VDC; a voltage control section 12 configured to produce a charge command ichg* in accordance with the difference signal; a subtraction section 13 configured to calculate a difference between the charge command ichg* and a capacitor current ic of the electric double layer capacitor C which is sensed by the current sensing section Di; a current control section 14 configured to control the current in accordance with the difference signal calculated by the subtraction section 13; and a PWM control section 15 configured to perform a PWM control based on the output of the current control section 14.

A numeral 20 is a discharge control section. This discharge control section 20 includes a subtraction section 21 configured to calculate a difference between the set value VDCL* outputted from the setting section 9 and the detection value of the direct-current voltage VDC; a voltage control section 22 configured to produce a discharge command idchg* in accordance with the calculated difference signal; a subtraction section 23 configured to calculate a difference between the discharge command idchg* produced by this voltage control section 22 and the capacitor current ic of the electric double layer capacitor C which is sensed by the current sensing section Di; a current control section 24 configured to control the current in accordance with the signal of the difference which is calculated by this subtraction section 23; and a PWM control section 25 configured to perform a PWM control based on the output of the current control section 24. A numeral 30 is an instantaneous-low high-speed-compensation section configured to compensate an instantaneous voltage drop of the electric power system. The instantaneous-low high-speed-compensation section 30 includes an electric power estimating (presuming) section 31 configured to receive the direct-current voltage VDC, and to estimate the electric power; and a dividing section 32. The result of the divide (division) of the electric power estimate value estimated from the direct-current voltage and the direct-current voltage VDC is outputted to the voltage control section 22.

In the thus-constructed control circuit of the power assist device 8, when the load 6 becomes a regenerative state, and the direct-current voltage VDC of the inverter 1 increases and becomes equal to or greater than the charge start voltage, the charge control is latched, and the charge control is performed until the voltage becomes equal to or smaller than the charge stop voltage. This charge control is performed during the charge control retention period. The control is performed so that the direct-current voltage VDC becomes the charge target value VDCH*. With this, the control is performed so that the direct-current voltage VDC does not exceed the charge target value VDCH* even when the regenerative load increases.

That is, the subtraction section 11 calculates the difference between the set charge target value VDCH* and the detected direct-current voltage VDC. The signal of the difference is inputted to the voltage control section 12. The voltage control section 12 is a controller having a function of a limiter. The voltage control section 12 outputs the charge command ichg* in accordance with the signal of the difference until reaching the limit value. The subtraction section 13 calculates a difference between the charge command ichg* and the capacitor current ic. The signal of the difference is inputted to the current control section 14. The current control section 14 calculates the current control signal for the charge control. The current control signal is outputted to the PWM control section 15. The PWM control section 15 performs the PWM control based on the inputted signal, and produces a signal Gchg*. The signal Gchg* becomes a gate signal to a switching element Gc of the chopper section CH, and becomes an ON/OFF signal for the charge.

When the load 6 does not become the regenerative state and the direct-current voltage VDC decreases equal to or smaller than the charge stop voltage, the charge control is stopped.

Next, when the load 6 becomes a power running state and the direct-current voltage VDC decreases equal to or smaller than the discharge start voltage, the discharge control is latched. The discharge control is performed so that the direct-current voltage VDC becomes the discharge target value until the voltage becomes equal to or greater than the discharge stop voltage. The discharge control section 20 performs the discharge control.

First, the subtraction section 21 calculates the difference between the set discharge target value VDCL* and the sensed direct-current voltage VDC. The difference signal is inputted to the voltage control section 22. The voltage control section 22 is a controller having a function of the limiter. The voltage control section 22 outputs a discharge command idchg* in accordance with the difference signal until reaching the limit value. The subtraction section 13 calculates a difference between the discharge command idchg* and the capacitor current ic. The difference signal is inputted to the current control section 24. The current control section 24 calculates a current control signal for the charge control. The current control signal is outputted to the PWM control section 25. The PWM control section 25 performs the PWM control based on the input signal, and produces a signal Gdchg*. The signal Gdchg* becomes a gate signal to a switching element Gd of the chopper section CH. The ON/OFF control is performed for the discharge until becoming the discharge stop voltage.

On the other hand, when the instantaneous voltage drop is generated by the power running state of the load, the control identical to the discharge control is performed. There is provided the instantaneous-low high-speed-compensation section 30 for performing the instantaneous voltage drop phenomenon by the high speed. The instantaneous-low high-speed-compensation section 30 estimates the voltage necessary for the discharge, from the discharge energy, and outputs the discharge current command. Accordingly, the power estimating section 31 stores, in advance, the capacitor capacity CI connected to the direct-current circuit of the inverter, and samples the direct-current voltage VDC at a time interval of Δt. This previous sampling value of this direct-current voltage VDC is set to V12, and the current sampling value of this direct-current voltage VDC is set to V22. The following calculation is performed.

$$\Delta W = \frac{1}{2}(CI)(V12 - V22)[J]$$

$$\Delta P = \Delta W / \Delta t [W]$$

The determined variation ΔP of the electric power is inputted to the dividing section 32. The following calculation is performed to determine the discharge current command idchgi*.

$$idchgi^* = \Delta P / VDC$$

The discharge idchgi* is inputted through the voltage control section 22 and the current control section 24 to the PWM control section 25. The compensation control corresponding to the instantaneous voltage drop is performed. When the direct-current voltage VDC is in the non-control region of the charge/discharge region, the gate commands of the charge and the discharge are shut off. For example, the only commercial electric power system continues to operate.

FIG. 2 shows a torque assist circuit by considering the electric power storage amount. The load 6 shown in FIG. 3 is an example for controlling the speed of the generator M through the motor M by the inverter 1. The generator G is a mechanical power source. FIG. 2 shows a control circuit for performing the torque assist of this mechanical power. A numeral 81 is a discharge threshold value setting section. The discharge threshold value setting section 81 sets a terminal voltage discharge threshold value Vedchg* of the electric double layer capacitor C. A numeral 82 is a terminal voltage sensing section of the electric double layer capacitor C. The subtraction section 83 subtracts the sensed voltage Ve from the electrode voltage discharge threshold value Vedchg*. This signal of the difference is inputted to a load compensation gain section 84 having a limiter function, and the gain compensation signal is obtained. These numerals 81-84 are provided within the control section of the direct-current power assist 8.

A numeral 40 shows a part of the inverter control section for performing the torque assist. A numeral 41 is a q-axis current command setting section. A numeral 42 is a q-axis current sensing section. A subtraction section 43 calculates a difference between the set value Iq* and the sensed current value Iq. A current control section 44 calculates the q-axis current command in accordance with the signal of the difference. A numeral 45 is a drive torque limiter section. The limiter value of the drive torque limiter section is varied by the gain compensation signal from a load compensation gain section 84. A numeral 46 is a PWM control section. The PWM control section 46 produces a PWM signal in accordance with the input signal, and outputs a gate signal of the switching element constituting the inverter.

FIG. 4 shows a state in which the control circuit shown in FIG. 2 performs the torque assist. A longitudinal axis is a terminal voltage (electric power storage amount) of the electric double layer capacitor. A lateral axis is a time. The terminal voltage discharge threshold value Vedchg* of the electric double layer capacitor is set to an arbitrary value of the electric power storage amount. Lines a and b are terminal voltage of the electric double layer capacitor and the torque when the torque assist control is performed. Lines c and d are terminal voltage and the torque when the torque assist control is not performed, it becomes the discharge limit at time t1. As is evident from FIG. 4, by the control circuit shown in FIG. 2, when the electric power storage amount is sufficient, the drive torque limiter section 45 is in the open direction. The drive torque limiter section 45 assists the large torque to the mechanical power of the generator G which is the load. Moreover, the control operation is performed so as to decrease the amount of the assist by decreasing the limiter of the drive torque limiter section 45 as the sensed voltage Ve approaches the voltage discharge threshold value Vedchg*.

As mentioned above, by the present invention, it is possible to set the charge control and the discharge control independently, and to set the direct-current voltage in accordance with the installation. With this, it is possible to maintain minimum direct-current voltage necessary for securing the maximum voltage of the motor and so on, and to decrease the switching loss of the switching element constituting the inverter and the chopper. Moreover, a non-control region is provided in a setting. With this, the unnecessary power assist is not needed. It is possible to effectively operate the entire system, and to increase the lifetime of the assist device.

EXPLANATION OF SYMBOLS

Figure 1:
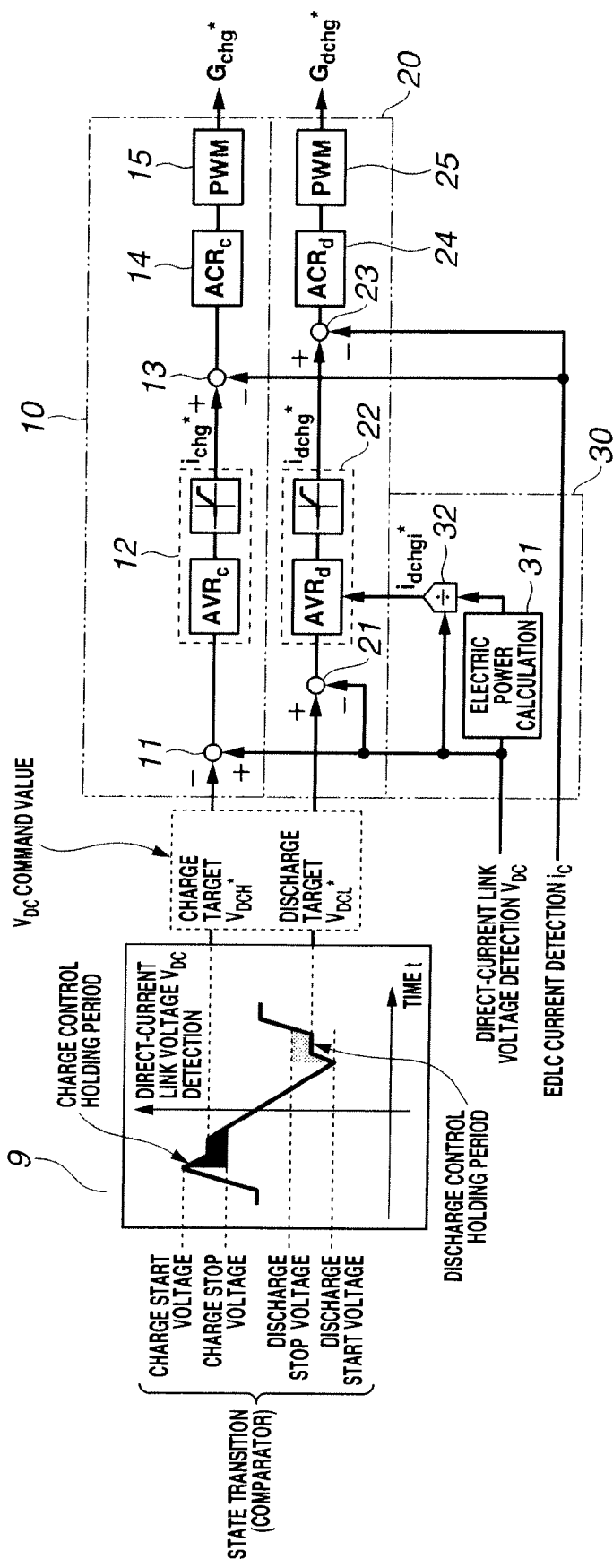
FIG. 1 is a control circuit diagram of the direct-current assist device showing an embodiment of the present invention.
Figure 2:
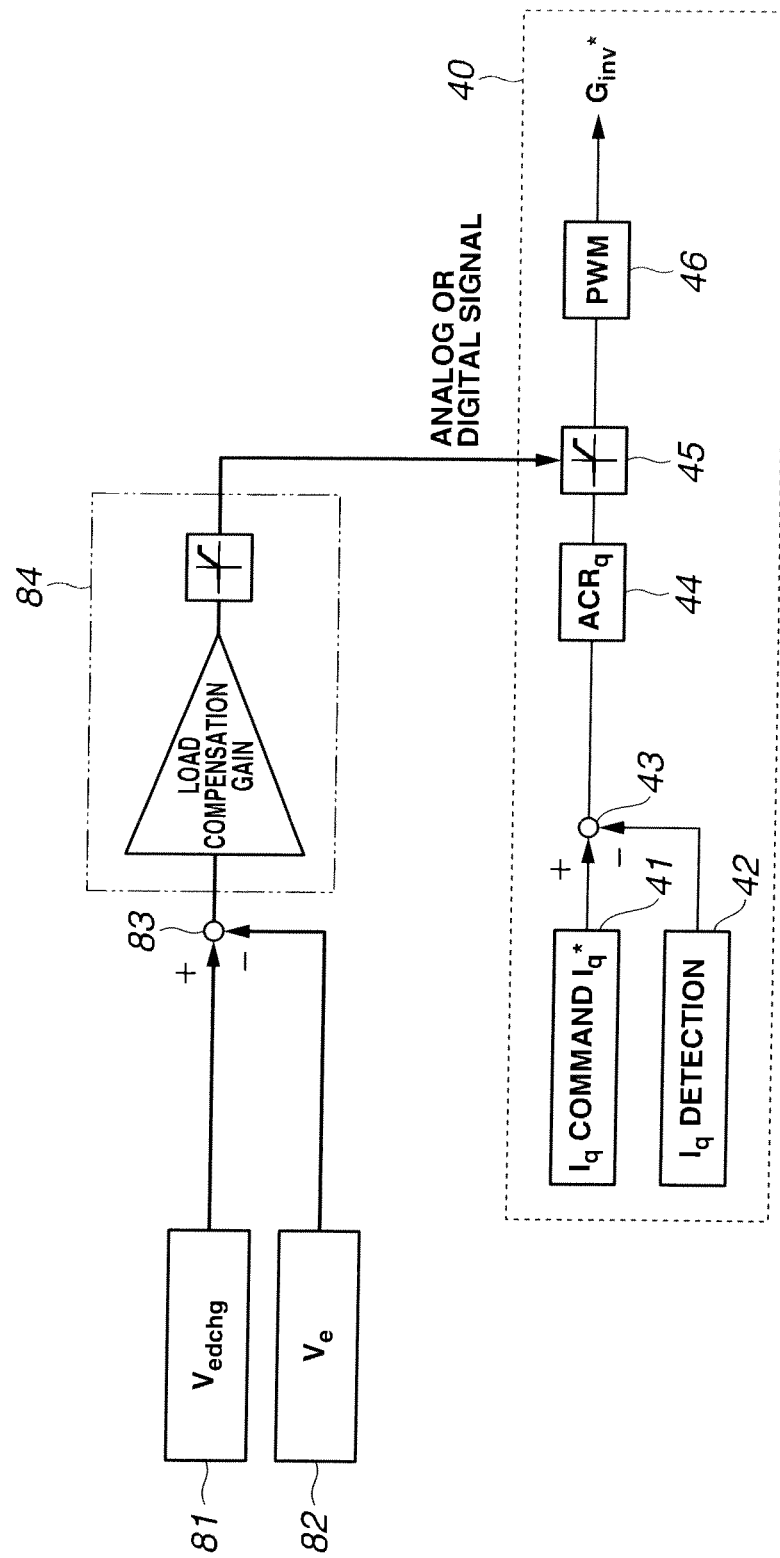
FIG. 2 is a control circuit diagram of the torque assist according to the present invention.
Figure 3:
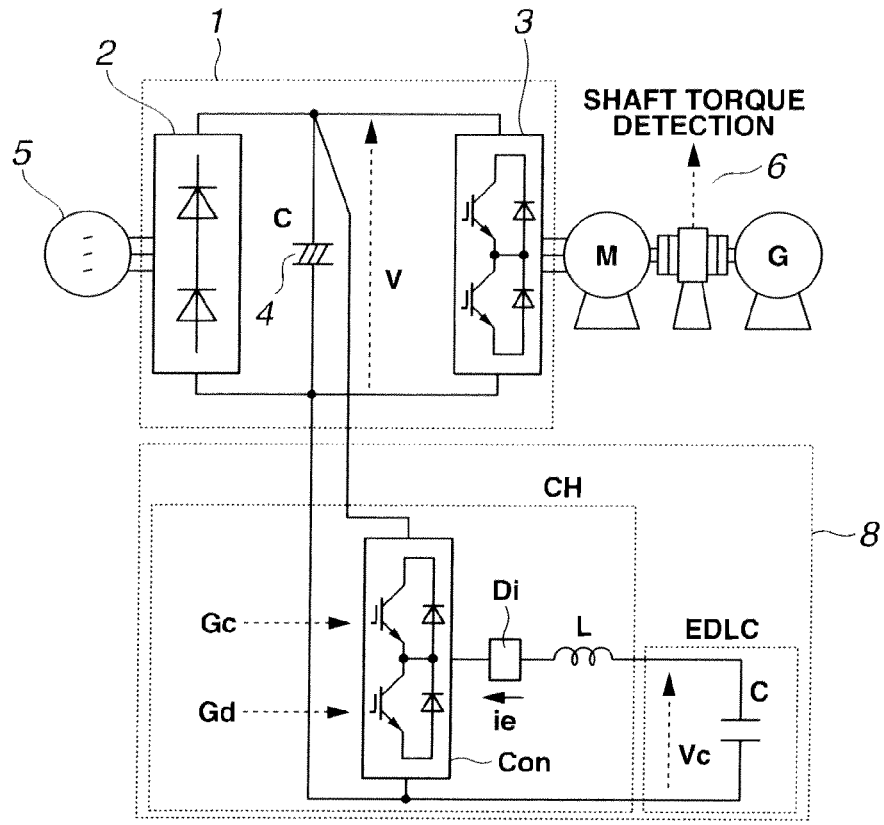
FIG. 3 is a schematic diagram of the power conversion device.
Figure 4:
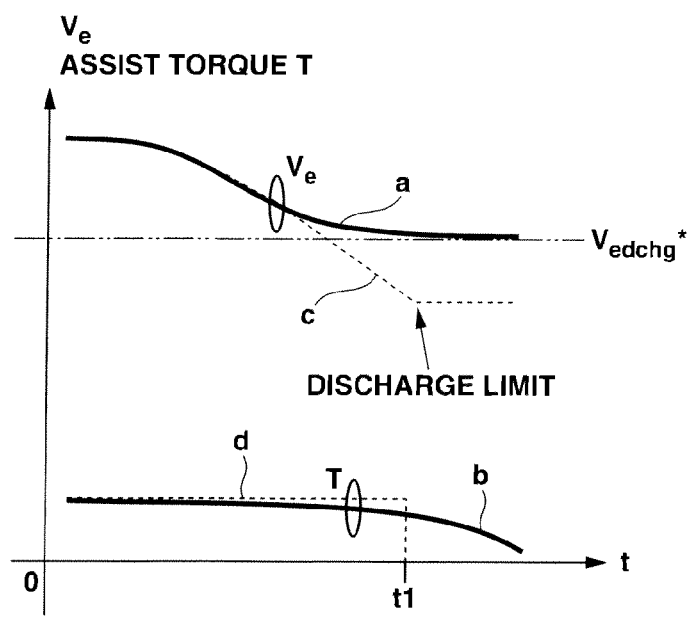
FIG. 4 is a state diagram of the torque assist.
Figure 5:
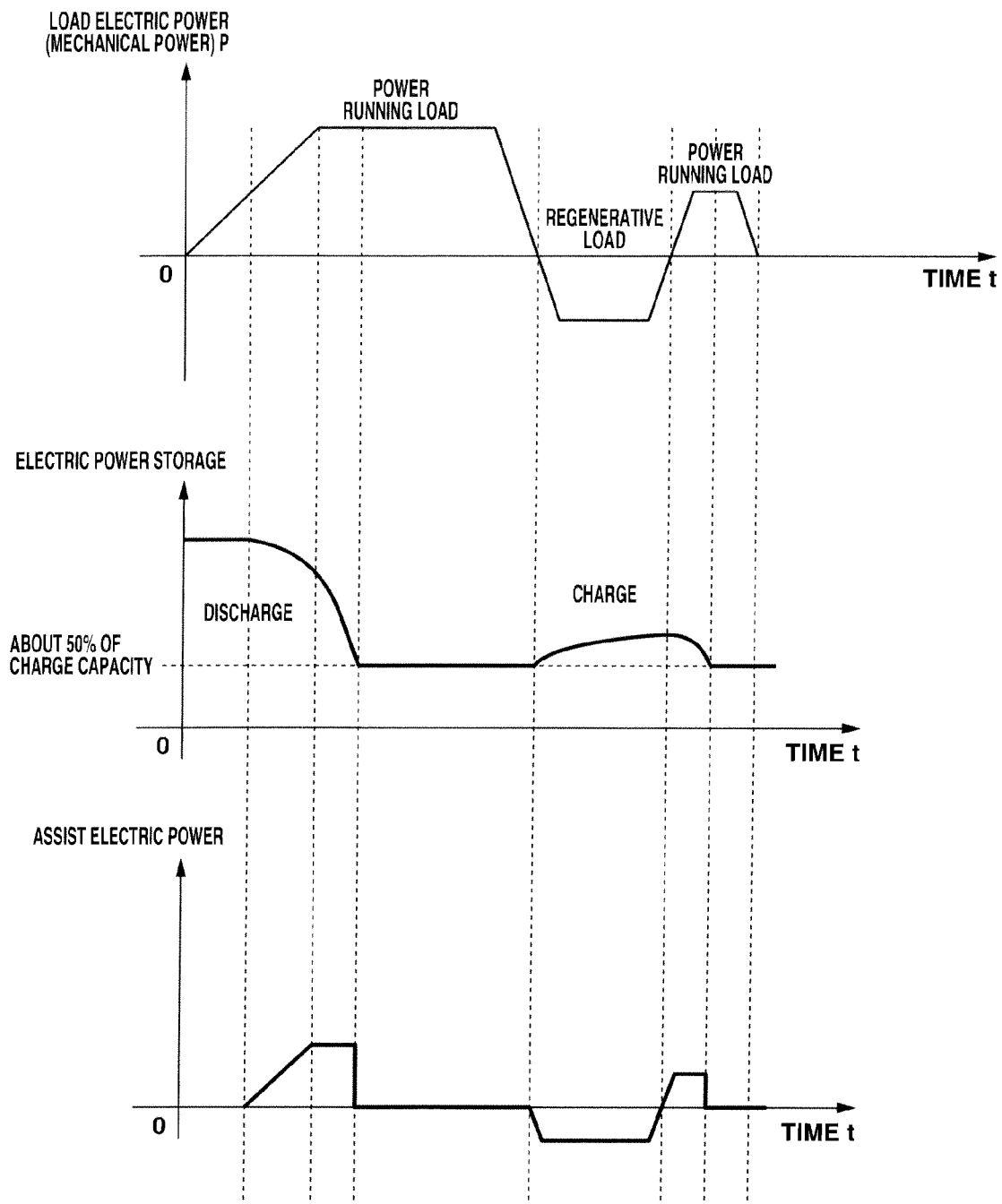
FIG. 5 is an illustrative view of the control of the load equalization.

1 . . . inverter
6 . . . load
8 . . . direct-current power assist device
9 . . . setting section
10 . . . charge control section
20 . . . discharge control section
12, 22 . . . voltage control section
14, 24, 44 . . . current control section
15, 25, 46 . . . PWM control section
40 . . . inverter control section
45 . . . drive torque limiter section
84 . . . load compensation gain section

The invention claimed is:

1. A power conversion device in which an inverter for controlling a load is connected to an alternating current power system, and which is arranged to perform an electric power assist by connecting a direct-current power assist device having a chopper and a charge device, to a direct-current circuit of the inverter, the power conversion device comprising:
a setting section for performing a charge control and a discharge control of the charge device;
a charge control section configured to perform the charge control based on a charge target value set by the setting section;
a discharge control section configured to perform the discharge control based on a discharge target value set by the setting section; and
an instantaneous-low high-speed-compensation section configured to estimate an electric power corresponding to a direct-current sensed voltage of the inverter, and to output a value which is obtained by dividing the estimated value by the direct-current sensed voltage, to the discharge control section,
the setting section having setting values of a charge start voltage, a charge stop voltage, a non-control voltage region, a discharge stop voltage, and a discharge start voltage, the setting section selecting the setting values in accordance with the sensed value of the direct-current sensed voltage of the inverter, and the setting section outputting the setting values to the charge control section and the discharge control section as the charge target value and the discharge target value.

2. The power conversion device as defined in claim 1, wherein the charge control section and the discharge control section include, respectively, voltage control sections configured to receive deviation signals between the charge target value or the discharge target value, and the direct-current sensed voltage of the inverter, and to calculate the charge command value and the discharge command value, current control sections configured to receive deviation values between the charge command value or the discharge command value outputted from the voltage control sections, and a sensed current of the charge device, and to calculate currents; and PWM control sections configured to receive, respectively, the charge command value and the discharge command value from the current control sections, and to produce gate signals of a charge switching element and a discharge switching element of the chopper.

3. The power conversion device as defined in claim 1, wherein the instantaneous-low high-speed-compensation section calculates a variation of the electric power from a variation of a discharge energy by a capacity of a capacitor installed in the direct current circuit of the inverter, and a sampling value of the inputted direct current sensed voltage, and to produce a discharge current command by dividing the calculated variation of the electric power by the direct-current sensed voltage.

4. The power conversion device as defined in claim 1, wherein the power conversion device includes a load compensation gain section configured to calculate a gain compensation signal in accordance with a deviation signal between a set terminal voltage discharge threshold value of the charge device and a sensed terminal voltage of the charge device, and a drive torque limiter section provided on an output side of a current control section of a control section of the inverter; and a limiter value of the drive torque limiter section is varied in accordance with the gain compensation signal outputted from the load compensation gain section.

* * * * *